US005080959A

United States Patent [19]

Tanaka et al.

[11] Patent Number: 5,080,959

[45] Date of Patent: Jan. 14, 1992

[54] MULTILAYER TILE AND METHOD OF MANUFACTURING SAME

[75] Inventors: Hideo Tanaka; Itaru Takeda; Hiroyuki Tada, all of Aichi, Japan

[73] Assignee: Inax Corporation, Aichi, Japan

[21] Appl. No.: 287,513

[22] Filed: Dec. 19, 1988

Related U.S. Application Data

[63] Continuation of Ser. No. 3,987, Jan. 16, 1987, abandoned.

[51] Int. Cl.[5] .......................... B32B 5/14; B32B 7/02

[52] U.S. Cl. .................................... 428/212; 264/60; 264/332; 264/DIG. 31; 428/217; 428/218; 428/697; 428/699; 428/701

[58] Field of Search .................. 428/697, 699; 264/60, 264/332, DIG. 31

[56] References Cited

U.S. PATENT DOCUMENTS

| | | | |
|---|---|---|---|
| 1,588,243 | 6/1926 | Lewis | 428/217 |
| 2,292,118 | 8/1942 | Guhl | 428/212 X |
| 3,862,660 | 1/1975 | Sakabe et al. | 428/212 X |
| 3,911,188 | 10/1975 | Torti, Jr. et al. | 428/212 X |
| 4,496,793 | 1/1985 | Hanson et al. | 428/212 X |

*Primary Examiner*—Jenna Davis
*Attorney, Agent, or Firm*—Sughrue, Mion, Zinn, Macpeak & Seas

[57] ABSTRACT

A multilayer tile, wherein the tile-materials of the first and third layers are substantially equal to each other in shrinkage during drying and firing and in thermal expansion coefficient after firing.

15 Claims, 6 Drawing Sheets

MULTILAYER TILE AND METHOD OF MANUFACTURING SAME

This is a continuation of application Ser. No. 07/003,987, filed Jan. 16, 1987, now abandoned.

BACKGROUND OF THE INVENTION

This invention relates to a multilayer tile, and a method of manufacturing the multilayer tile.

In general, tile is manufactured as follows: Feldspar, clay, and pottery stone are suitably pulverized and mixed. The mixture is further pulverized to form a mud-like material. The mud-like material thus formed is further pulverized to form a raw material for manufacturing tiles (hereinafter referred to as "tile raw material" or "tile-material") The tile-material is put in a mold and dry-pressed to form a molding. The molding is dried and then fired to obtain the desired tile.

A conventional tile manufacturing method is a so-called "one-layer molding method" in which one kind of tile-material is molded to form a molding for manufacturing a tile (hereinafter referred to as a "tile-molding") by pressing according to a tile-molding forming procedure as shown in diagrams (a) through (f) of FIG. 2. Diagrams (a) through (c) of FIG. 2 are sectional views, and diagrams (d) through (f) are top views. In the method, a mold consisting of a punch 1 and a die 2 as shown in the diagram (a) of FIG. 2 is employed. First, a tile-material supplying member 3 is moved as shown in diagrams (d) and (e) of FIG. 2 so that the tile-material *3a* is placed in the cavity formed of the lower die *2a* and side die *2b* as shown in diagram (b) of FIG. 2. Thereafter, the tile-material supplying member 3 is returned to its original position as shown in diagram (f) of FIG. 2. Under this condition, the punch 1 is moved downwardly to press the tile-material in the die 2 to form a tile-molding as shown in diagram (c) of FIG. 2.

However, the one-layer tile manufactured according to the above-described one-layer molding method is disadvantageous in the following points:

(1) In order to color the molding, pigment must be distributed throughout the entire molding even though only the surface is desired to be colored. Therefore, the pigment is uneconomically used, with the result that the material cost is much increased.

(2) In the case where the tile-material contains a material such as an iron compound which is readily molten, it is liable to adhere to refractory members such as shelf boards and rollers during the firing operation. As a result, the manufactured tiles may have defects, or the refractory members may be deteriorated.

(3) It is difficult to give the inside of the tile a different function.

In order to overcome these disadvantages, recently a two-layer molding method has been employed in which, as shown in diagrams (a) through (e) of FIG. 3, two kinds of tile-material are placed in the die and pressed to form a tile-molding. Diagrams (a) through (e) of FIG. 3 are sectional views and diagrams (f) through (j) are top views. In the method, a punch 1, a die 2, and two tile-material supplying members 3 and 4 are used. First, one *3a* of the two kinds of tile-materials is placed in the die 2 with the tile-material supplying member 3 as shown in diagrams (b), (g), and (h) of FIG. 3, and then the lower die 2 is lowered as shown in diagram (c) of FIG. 3. Under this condition, the other tile-material *4a* is placed in the cavity of the die 2 with the other tile-material supplying member 4 as shown in diagrams (i), (d), and (j) of FIG. 3. Thereafter, the punch 1 is moved downwardly to press the tile-materials laid in two layers to form a two-layer molding as shown in diagram (e) of FIG. 3.

The above-described two-layer molding method is advantageous in the following points:

(1) A colored tile can be obtained by mixing the pigment only in the outer layer of tile-material. Therefore, the pigment can be used economically, and the material cost can be reduced as much.

(2) If a tile-material showing required color, surface quality, etc., is used for the outer layer of a tile to be manufactured, then a tile-material such as waste clay which is lower in quality can be used for the inner layer of the tile, which contributes to a reduction of the tile manufacturing cost.

(3) Even in the case where tile-material having the desired quality contains a material such as an iron compound which is liable to be molten during the firing operation, the above-described disadvantages can be eliminated as follows: If a tile-material which does not contain such a material is used for forming the under layer of the tile, then the difficulty that the molding adheres to the refractory members during firing is eliminated. Accordingly, the aforementioned problems that the manufactured tiles are defective and the refractory members are deteriorated are eliminated.

(4) Materials such as non-plastic materials which cannot be molded without other additional materials can be employed to form a tile-molding. That is, in the two-layer molding method, a tile-molding can be formed by combining the tile-material with a material which is high in strength.

The two-layer molding method is advantageous as described above; however, it is still disadvantageous in the following points:

In the manufacture of a two-layer tile, the upper layer of tile-material and the lower layer of tile-material differ in the degree of shrinkage while the tile is drying and firing. That is, in such case, the degree of shrinkage therebetween becomes clearly different in the steps of the firing as the temperature increases and the maturing. In the other case that the tile material is already fired, the upper layer of fired tile-material and the lower layer of fired tile-material becomes different in contraction while the tile is cooling. That is, the contraction corresponds with the thermal expansion coefficient. Therefore, the expansion between the upper layer of fired material and the lower layer of fired material becomes clearly different after the firing temperature over a peak thereof. Then, the tile-molding is deformed, or bent. As the tile-molding is further deformed, the upper layer of tile-material and the lower layer of tile-material become partially or totally separated from each other.

If the upper layer of tile-material and the lower layer of tile-material are equal to each other in thermal expansion coefficient or shrinkage, the above problem would not occur. However, in general, the upper layer of tile-material is much different in thermal expansion coefficient or shrinkage from the lower layer of tile-material, and therefore the difficulty that the two-layer tile is bent during the firing operating cannot be eliminated. This tendency is significant especially in a tile 300 mm×300 mm or larger.

SUMMARY OF THE INVENTION

Accordingly, an object of this invention is to provide a tile in which the above-described problems accompanying a two-layer tile have been eliminated.

Another object of the invention is to provide a method of manufacturing such a tile.

The foregoing objects and other objects of the invention have been achieved by the provision of a multilayer tile comprising, from the surface, first, second, and third layers, in the stated order, wherein the tile-materials of the first and third layers are substantially equal to each other in shrinkage during drying and firing and in thermal expansion coefficient after firing, and by the provision of a method of manufacturing a multilayer tile in which a first tile-material is placed in a tile forming mold to form a bottom layer, a second tile-material different from the first tile-material is placed on the bottom layer to form an intermediate layer, a third tile-material is placed on the intermediate layer, to form a surface layer, said bottom, intermediate, and surface layers thus placed are dry-pressed to form a molding, and the molding thus formed is fired. The nature, principle and utility of the invention will become more apparent from the following detailed description when read in conjunction with the accompanying drawings. The first tile-material is substantially equal to the third tile-material in shrinkage during drying and firing and in thermal expansion coefficient after firing.

Figure 2:
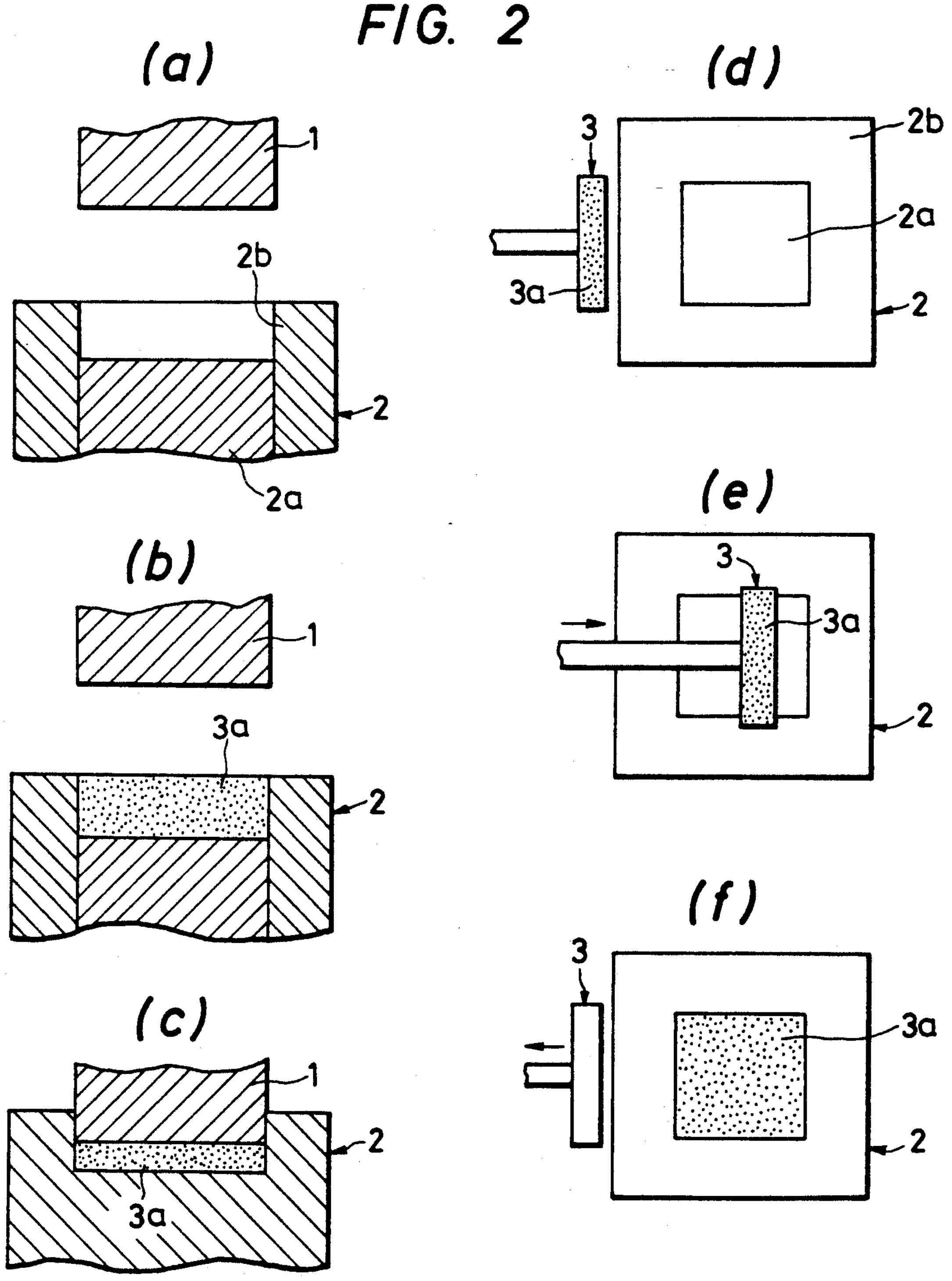
Figure 3:
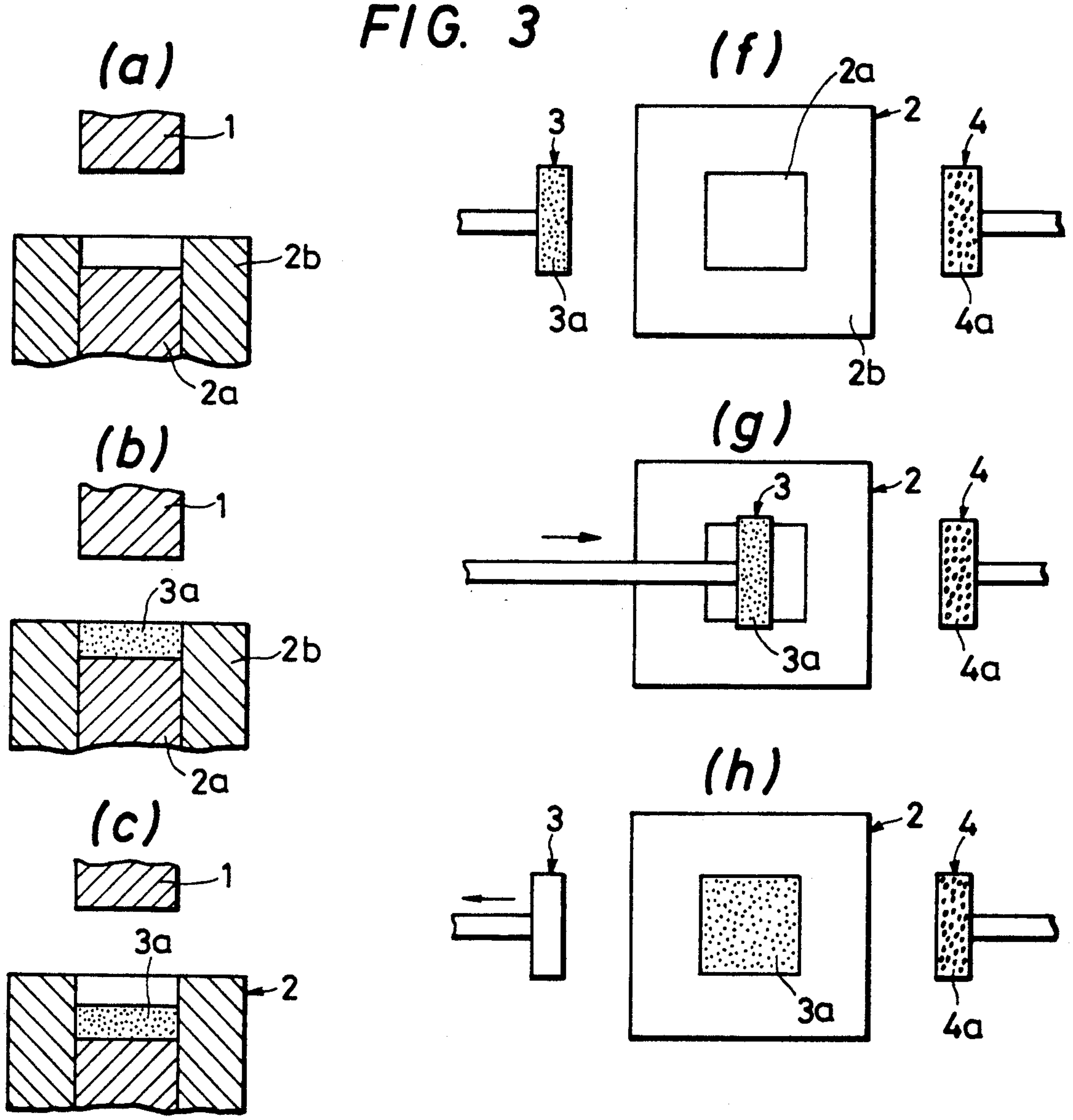
Figure 3:
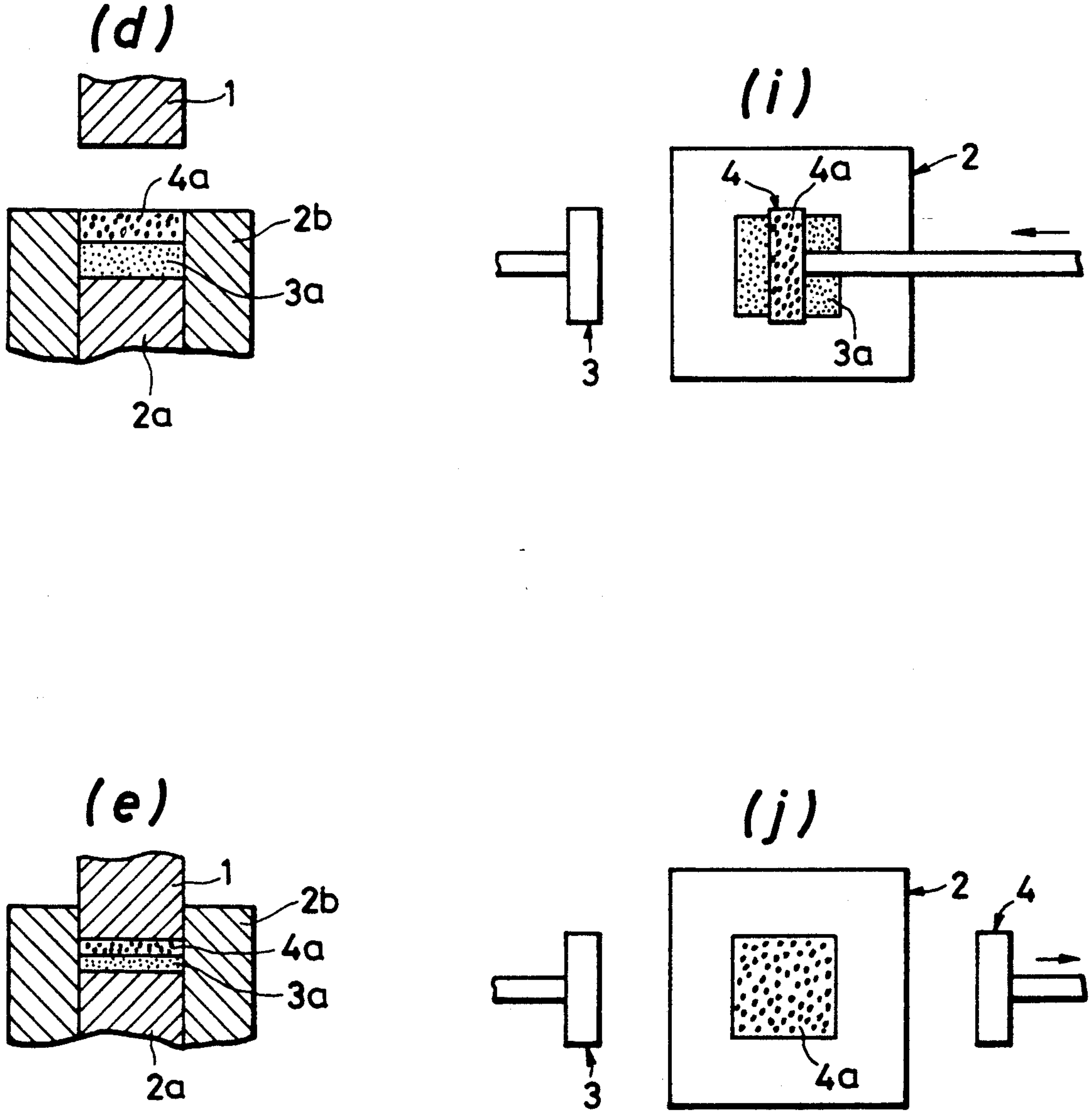
Figure 4:
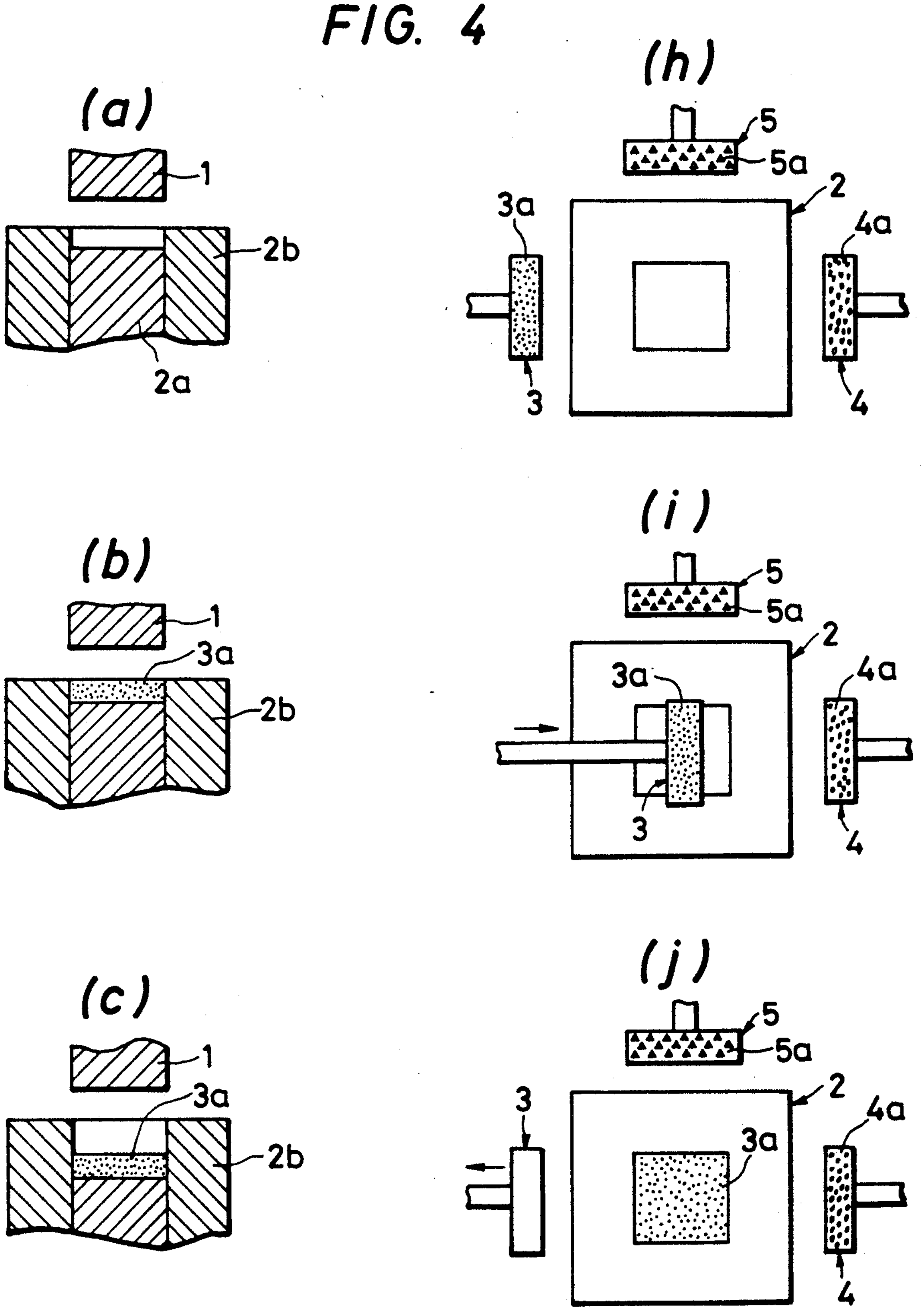
Figure 4:
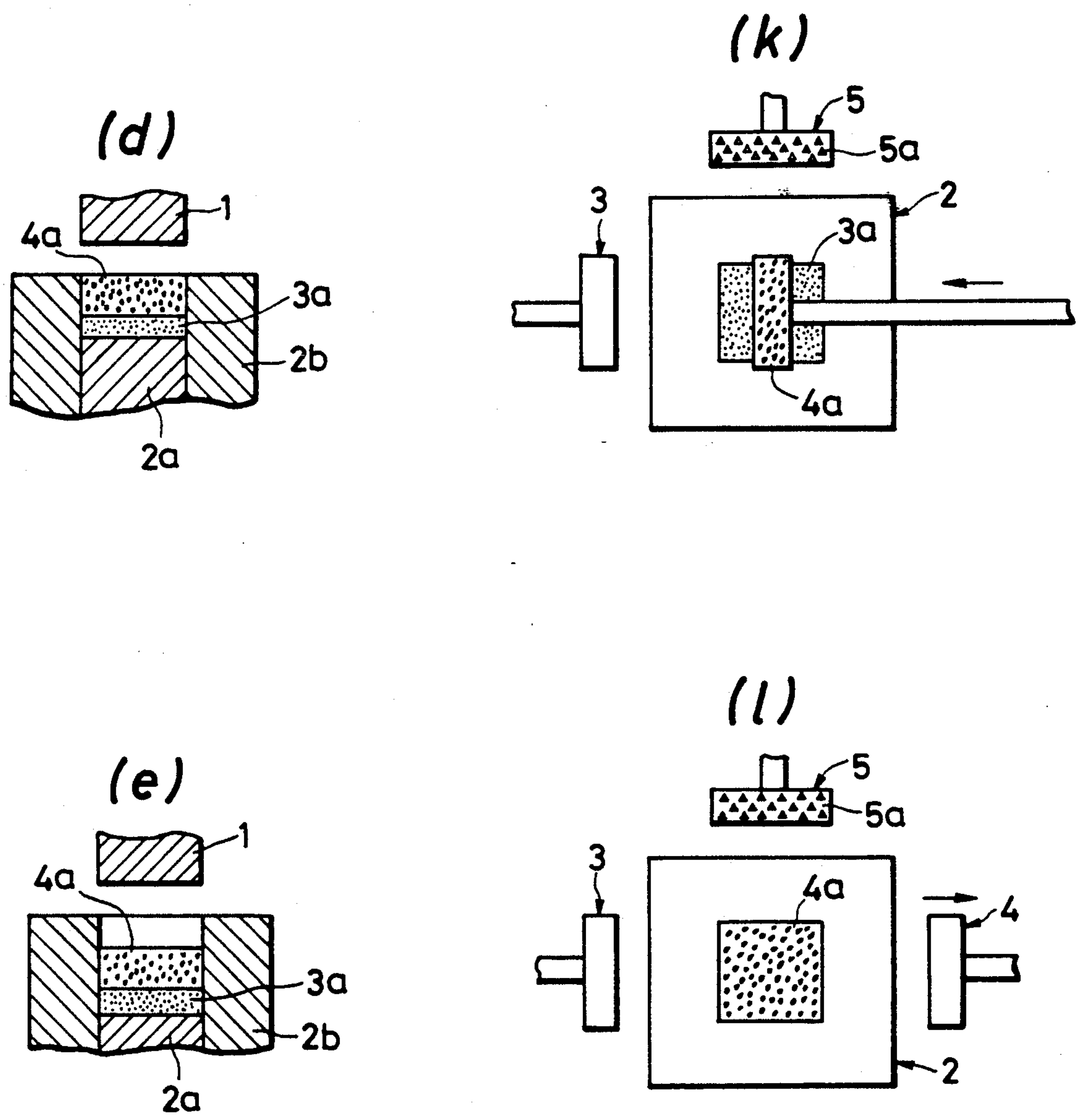
Figure 4:
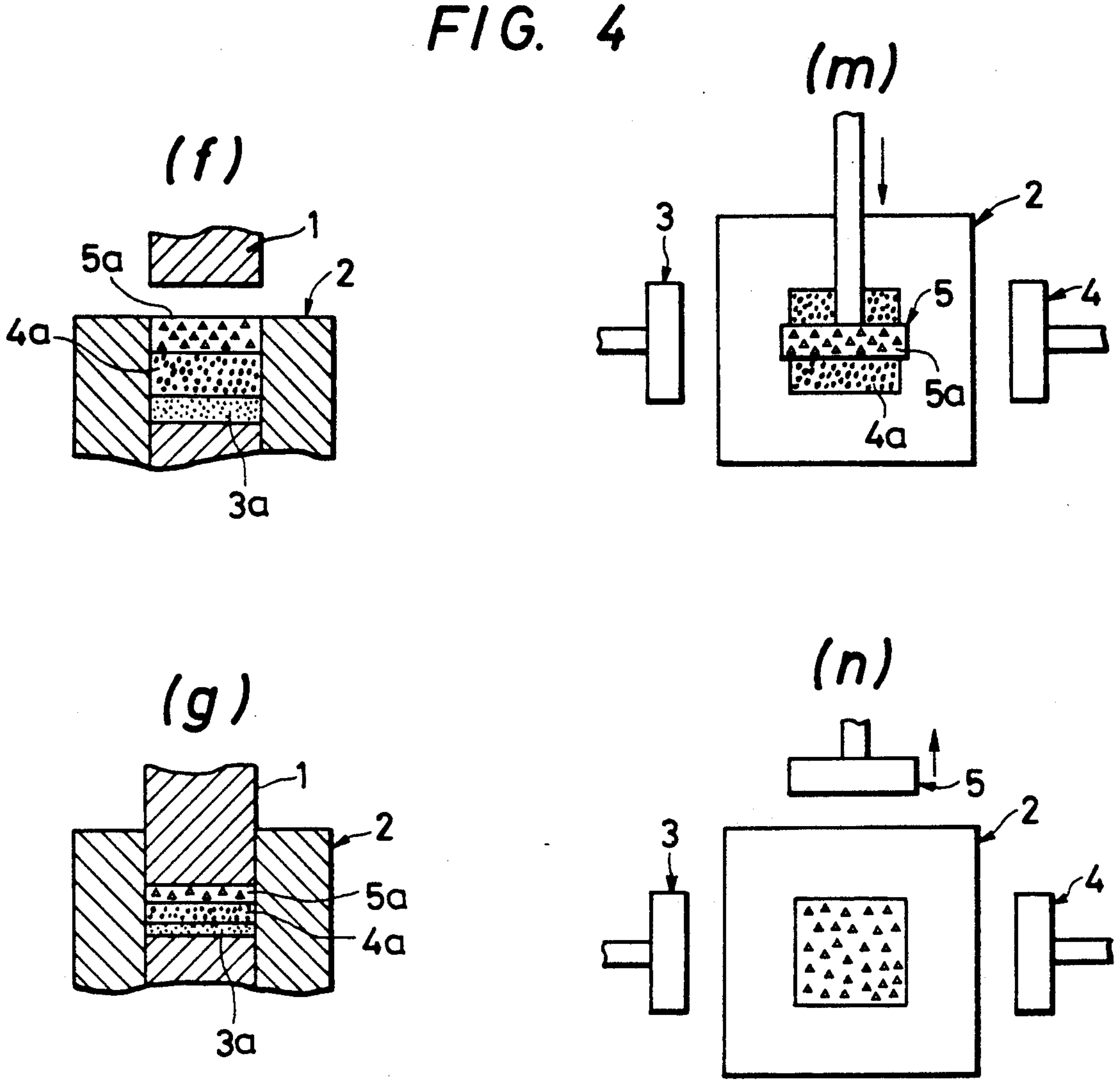
Figure 5:
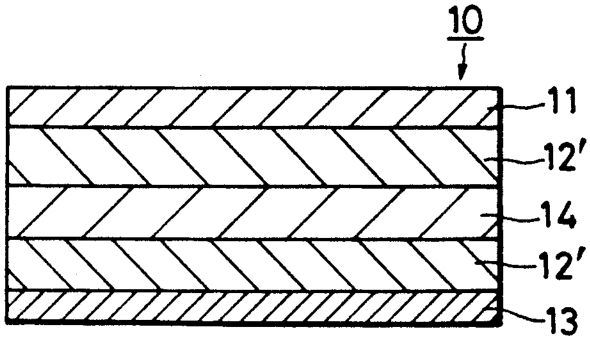

Diagrams a) through (f) of FIG. 2 are diagrams illustrating a conventional one-layer tile manufacturing method;

Diagrams (a) through (j) of FIG. 3 are diagrams illustrating a conventional two-layer tile manufacturing method;

Diagrams (a) through (n) of FIG. 4 are diagrams illustrating a three-layer tile manufacturing method according to the invention; and FIG. 5 is sectional view showing another embodiment of a multilayer tile of the invention in which a reinforcing layer is provided between two intermediate layers.

DETAILED DESCRIPTION OF THE INVENTION

Figure 1:
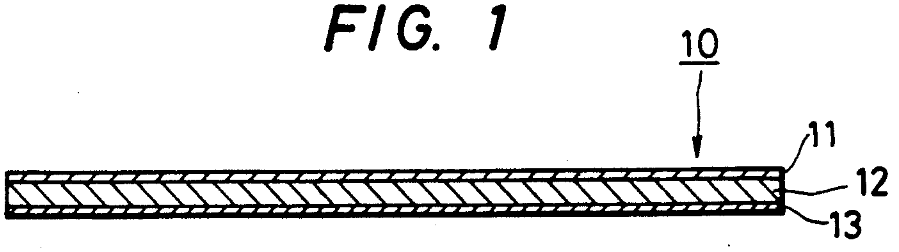
FIG. 1 is a sectional view showing one example of a three-layer tile according to this invention.

One example of a three-layer tile according to this invention, as shown in FIG. 1, is made up of a first (surface) layer 11, a second layer 12, and a third layer 13, present in the stated order.

In order to positively prevent the tile from bending during firing, the tile-material for the first layer 11 should be substantially equal to a tile-material for the third layer 13 in shrinkage during drying and firing and in thermal expansion coefficient after fired. In one preferred embodiment, the same tile-material is used for forming the first layer 11 and the third layer 13. It is desirable that the shrinkage A of the tile-material for the first layer, the shrinkage C of the tile-material for the third layer, and the shrinkage B of the tile-material for the second layer satisfy the following conditions:

$0.8C < A < 1.2C$; and $0.6B < A, C < 1.4B$.

More preferably, $0.9C < A < 1.1C$, and $0.8B < A, C < 1.2B$.

Most preferably $A = C = B$.

The following reasons indicate why A and B, and B and C are desirably nearly equal. In the case where the tile-materials of the first and second layers, or the second and third layers are excessively different from each other in shrinkage, and also in thermal expansion coefficient after firing, sometimes depression-like defects are formed in the surface of the first layer, and the first and second layers are partially or totally peeled apart, even though the tile is not bent.

In the tile manufacturing method of the invention, the tile-materials are prepared according to the conditions described above. That is, the tile-materials for the first and third layers are typically an ordinary tile-material which is prepared by mixing feldspar of from 40 to 80 parts by weight, pottery stone of up to 40 parts by weight, and clay of from 10 to 40 parts by weight, per 100 parts by weight of the tile-material used as essential components, and as necessary other tile-forming mineral components (i.e., components forming the tile layer together with the essential components) as shown in working Examples 1 and 2. A tile-material considerably lower in quality which contains industrial waste tile material such as chamotte can be employed for the second layer, and chamotte can also be used in the third (bottom) layer.

The thicknesses of the first, second, and third layers of the tile 10 are variable, and optinum thicknesses depend on the size and the thickness of the tile 10. When the first layer 11 is the outer (or surface) layer of the tile 10, it is preferable that the first layer 11 is at least 2 mm in thickness. If, in the case where the thickness of the first layer is smaller than 2 mm, and the above-described tile-material low in quality is used for the second layer, then the second layer affects the tile surface adversely; for instance, the tile surface may be rendered irregular in color and uneven, i.e., the manufactured tile is defective.

The third layer prevents the tile from bending during the firing operation. In the case where it is used as the inner (bottom) layer of the tile, it is unnecessary to make the thickness of the third layer large to the extent that the color and the flatness of the third layer is not affected by the second layer; however, it is preferable that the thickness of the third layer is substantially equal to that of the first layer.

The thickness of the second layer is not particularly limited. However, in the case where the ordinary tile material is used for the first and third layers and the tile-material low in quality such as the industrial disposal material is used for the second layer, as the thickness of the second layer is increased, the quantity of use of the tile-material low in quality can be increased. This method is advantageous in that the tile manufacturing cost can be decreased as much and the industrial disposal material can be reused.

The three-layer manufacturing method according to the invention is now further described with reference to FIG. 4. In FIG. 4, parts (a) through (g) are sectional views and diagrams (h) through (n) are top views.

In the three-layer manufacturing method of the invention, as shown in FIG. 4, a mold consisting of a punch 1 and a die 2, and three tile-material supplying members 3, 4, and 5 are employed. Three kinds of tile-material 3a, 4a, and 5a are prepared, and loaded respectively in the tile-material supplying members 3, 4, and 5 as shown in diagram (h) of FIG. 4.

Under this condition, the tile-material supplying member 3 is moved to place the first tile-material 3a in the die 2 as shown in diagrams (i), (b), and (j) of FIG. 4. Then, the bottom of the die 2 is lowered as shown in diagram (c) of FIG. 4, and the tile-material supplying member 4 is moved to place the second tile-material 4a in the die 2 as shown in diagrams (k), (d), and (l) of FIG. 4. The bottom of the die 2 is lowered again as shown in diagram (e) of FIG. 4. Under this condition, the tile-material supplying member 5 is moved to put the third tile-material 5a in the die 2 as shown in diagrams (m), (f), and (n) of FIG. 4. Under this condition, the punch 1 is moved downwardly to press the first, second, and third tile-material layers 3a, 4a, and 5a in the die 2.

In the above-described method, the quantities of first, second, and third tile-materials 3a, 4a, and 5a, that is, the thicknesses of the layers of first, second, and third tile-materials 3a, 4a, and 5a can be readily controlled by adjusting the position of the bottom of the die 2.

The three-layer tile manufacturing method of the invention is not limited to that which has been described with reference to FIG. 4. For instance, the positions of the tile-material supplying members 3, 4, and 5 may be changed if necessary. In the case where the same tile-material is used for the first and second layers of the tile, the number of tile-material supplying members can be reduced to two (2).

In the three-layer tile manufacturing method described with reference to FIG. 4, the bottom, second, and surface layers are pressed to form a molding. The molding thus formed is placed in a tile-firing furnace such as a tunnel furnace and is fired into a tile.

As is apparent from the above description, the first layer is substantially equal to the third layer in shrinkage. Therefore, the bending of the tile which otherwise may be caused by the difference in shrinkage between the first or third layer and the second layer is positively prevented.

As conducive to a full understanding of the invention, a few specific examples of the multilayer tile manufacturing method of the invention are described below.

EXAMPLE 1

A three-layer tile molding as shown in FIG. 1 was formed according to the method described with reference to diagrams (a) through (n) of FIG. 4.

In this example, the compositions of pottery tile materials for the first layer, second layer (having a composition different from and containing a larger ratio of clay than other two layers) and third layer and the thickness of these layers are shown in Table 1. The pressure of pressing the layers was set to about 150 kg/cm$^2$. The size of the molding was 150 mm×150 mm×20 mm.

The molding was fired in a tunnel furnace according to a conventional method. Particularly, the molding was fired in a tunnel furnace having a maximum temperature of 1,210° C. for about fifty hours while being conveyed (or equivalently in an RHK (Roller Hearth Kiln) having a maximum temperature of 1,310° C. for about three hours) to form a three-layer pottery tile as shown in FIG. 1. During firing, the tile was not bent, and the layers were not separated from one another. The three layers were completely combined together The upper and lower surfaces of the tile were uniform in color and smooth. That is, the tile manufactured according to the method of the invention was quite satisfactory in quality.

TABLE 1

| Layer | Tile-material | Composition of tile-material (parts by weight) | Shrinkage (%) | Thickness (mm) |
|---|---|---|---|---|
| 1st layer | Ordinary tile material | feldspar 50, pottery stone 20, clay 30, sand (8 mesh or under) 70 | 4.60 | 5 |
| 2nd layer | Industrial waste material | feldspar 30, pottery stone 20, clay 50, chamotte 15 | 5.12 | 10 |
| 3rd layer | Ordinary tile-material | feldspar 50, pottery stone 20, clay 30, sand (8 mesh or under) 70 | 4.60 | 5 |

EXAMPLE 2

In this example, the compositions of pottery tile materials for the first layer, second layer (having a composition different from and containing a larger ratio of clay than other two layers) and third layer, and the thicknesses of these layers, are shown in the following Table 2. The pressure of pressing the layers was about 350 kg/cm$^2$. The size of the molding formed was 450 mm×450 mm×20 mm (thickness). The molding was fired in the method as described in Example 1. Similarly as in the case of Example 1, the first, second, third layers were firmly combined into an integral unit, and the resultant pottery tile was uniform in color and showed flat surfaces, that is, it had no defects.

TABLE 2

| Layer | Tile-material composition (parts by weight) | Shrinkage (%) | Thickness (mm) |
|---|---|---|---|
| 1st layer | feldspar 50, pottery stone 20, clay 30, sand (8 mesh or under) 50 | 5.72 | 4 |
| 2nd layer | feldspar 40, pottery stone 20, clay 40, chamotte 10 | 6.84 | 12 |
| 3rd layer | feldspar 50, pottery stone 20, clay 30, chamotte 50 | 6.21 | 4 |

In this example, the tile-material of the first layer and the tile-material of the third layer are different. In the third layer, the chamotte was well compounded. The chamotte consisted of small pieces of fired tile-material. The tile-material of the third layer was not molten during the firing operation, so that the molding did not stick to the refractory members or rollers in the furnace or kiln during firing.

The invention has been particularly described with reference to three-layer tiles; however, it should be noted that the invention is not limited thereto or thereby. That is, multilayer tiles with additional layers can also be formed according to the invention. One example of such a multilayer tile is as shown in FIG. 5. The multilayer tile can be obtained by dividing the second layer 12 of FIG. 1 into two layers 12′ and 12′ and interposing a reinforcing layer 14 between the two layers 12′.

In the three-layer tile, the second (intermediate) layer contains industrial disposal material such as chamotte. Therefore, the three-layer tile fluctuates in strength, or is relatively low in strength. In the multilayer tile, the second layer is reinforced by the additional reinforcing layer 14 which contains no industrial disposal material such as chamotte, but rather contains more than 50% clay by weight. Clay has good strength to maintain the shape of the clay-containing layer. Therefore, the multilayer tile shown in FIG. 5 shows less fluctuation in strength; that is, it is much higher in strength than the three-layer tile. This will become more apparent from the following Table 3 indicating the comparison between the strength of the three-layer tile having no reinforcing layer and that of the three-layer tile having the reinforcing layer. In this comparison, the reinforcing layer was 4 mm in thickness, and its composition was 30% feldspar, 20% pottery stone, and 50% clay, by weight with or without chamotte as shown in the following Table 3.

TABLE 3

| chamotte of intermediate layer 12 (12') (%) | Strength of three-layer tile* having no reinforcing layer ($kgf/cm^2$) | Strength of multi-layer tile** having reinforcing layer ($kgf/cm^2$) |
|---|---|---|
| 0 | 174 | 178 |
| 5 | 162 | 174 |
| 10 | 151 | 170 |
| 15 | 142 | 164 |
| 20 | 131 | 157 |

*thickness of the three-layer tile was the same as shown in Table 2.
**Thickness of each layer was 4 mm.

EFFECTS OF THE INVENTION

As is apparent from the above description, the multilayer tile according to the invention is obtained by laminating first, second, and third layers, and the first and third layers are substantially equal to each other in shrinkage. Even if the first or third layer is fairly substantially different in shrinkage from the second layer, the tile will never be formed bent. In addition, industrial disposal material such as chamotte can be used for forming the second layer, as in some embodiments the third layer, of the tile. This is considerably advantageous in the economical use of material.

Furthermore, the multilayer tile of the invention has the above-described advantages of the two-layer tile that (1) the consumption of pigment is less, (2) tile-material low in quality can be used, (3) the molding is not stuck to the refractory members during firing, and (4) even non-plastic materials can be molded, and yet can overcome the disadvantage of the two-layer tile that the tile-molding is bent during firing.

Depending on the intended end use of the tile, the second layer may be formed utilizing heat conducting material or heat insulating material.

The multilayer tile can be readily manufactured according to the method of the invention. Furthermore, even a large tile can be satisfactorily manufactured without defects such as bends which otherwise may be caused during firing. Thus, the tiles can be efficiently manufactured according to the invention.

What is claimed is:

1. A multilayer pottery tile without substantial bends produced by dry-pressing and then firing in a kiln or furnace, which comprises, from the surface, first, second and third layers, in the stated order; wherein pottery tile-materials forming the first and third layers are substantially equal to each other in shrinkage during drying and firing and in thermal expansion coefficient after firing; wherein the shrinkage A of the tile material for the first layer, the shrinkage C of the tile material of the third layer, and the shrinkage B of the tile material for the second layer satisfy the conditions $0.8C<A<1.2C$, and $0.6B<A$, $C<1.4B$; wherein the first and third layers are formed from tile-material mixtures comprising feldspar, pottery stone and clay; and wherein the second immediate layer is formed from a tile-material mixture different from those mixtures for other two layers, comprising feldspar, pottery stone and clay, and containing clay in a ratio larger than those mixtures for other two layers to maintain the shape of the second intermediate layer.

2. A multilayer tile according to claim 1, in which the second layer contains clay in a ratio larger than the first and third layers to maintain the shape of the second layer and to increase the strength of the multilayer tile.

3. A multilayer tile according to claim 1, in which the first and third layers comprise, as essential components, 40 to 80 parts of feldspar, up to 40 part of pottery stone and 10 to 40 parts of clay per 100 parts by weight of the mixture of essential components.

4. A multilayer tile according to claim 1, in which the second layer comprises a waste tile material.

5. A multilayer tile according to claim 1, in which the second layer is composed of a plurality of layers and includes a reinforcing layer.

6. A multilayer tile according to claim 1, in which the shrinkages A, B and C satisfy the conditions $0.9C<A<1.1C$, and $0.8B<A$, $C<1.2B$.

7. A multilayer tile according to claim 1, which has a size of 300 mm×300 mm or more without substantial bends.

8. A method for manufacturing a multilayer pottery tile without substantial bends, which comprises the following steps;

a first pottery tile-material mixture, which is not substantially molten during a firing step and comprises feldspar, pottery stone and clay, is placed in a tile-forming mold to form a bottom layer, a second pottery tile-material mixture, different from pottery tile material mixtures for other layers and containing clay in a ratio larger than the mixtures for other layers to maintain the shape of the second layer, is placed on said bottom layer to form an intermediate layer, a third pottery tile-material mixture, which comprises feldspar, pottery stone, and clay, and which is substantially equal to said first tile-material in shrinkage during drying and firing and in thermal expansion coefficient after firing, is placed on said intermediate layer to form a surface layer, wherein the shrinkage A of the tile material for the surface layer, the shrinkage C of the tile material for the bottom layer, and the shrinkage B of the tile material for the intermediate layer satisfy the conditions $0.8C<A<1.2C$, and $0.6B<A$, $C<1.4B$, said bottom, intermediate and surface layers thus placed are dry-pressed to form a molding, and then said molding thus formed is fired in a kiln or furnace, whereby a multilayer pottery tile is produced without substantial bends and the bottom layer thereof is prevented from sticking onto the kiln or furnace.

9. A method according to claim 8, in which the material for the intermediate layer comprises feldspar, pottery stone and clay, and contains clay in a ratio larger than the first and third layers to maintain the shape of the second layer and to increase the strength of the multilayer tile.

10. A method according to claim 8, in which the materials for the first and third layers comprise, as essential components, 40 to 80 parts of feldspar, up to 40 parts of pottery stone and 10 to 40 parts of clay per 100 parts by weight of the mixture of essential components.

11. A method according to claim 8, in which the material for the intermediate layer comprises a waste tile material.

12. A method according to claim 8, in which the second intermediate layer is composed of a plurality of layers and includes a reinforcing layer.

13. A method according to claim 8, in which the shrinkages A, B, and C satisfy the conditions $0.9C<A<1.1C$, and $0.8B<A, C<1.2B$.

14. A method according to claim 8, in which the resulting multilayer tile has a size of 300 mm×300 mm or more without substantial bends.

15. A method according to claim 8, in which the material for the bottom layer contains chamotte to prevent the bottom layer from sticking onto the kiln or furnace.

* * * * *